United States Patent [19]

Hardway, Jr.

[11] 3,729,728

[45] Apr. 24, 1973

[54] CAPACITIVE SWITCHING DEVICE

[75] Inventor: Edward V. Hardway, Jr., Houston, Tex.

[73] Assignee: Spearhead, Inc., Houston, Tex.

[22] Filed: May 10, 1971

[21] Appl. No.: 141,696

[52] U.S. Cl. ..................340/200, 340/347 P, 323/93, 317/253

[51] Int. Cl. ..............................................G08c 19/00

[58] Field of Search ...........................340/200, 347 P; 317/253; 323/93

[56] References Cited

UNITED STATES PATENTS

| | | | |
|---|---|---|---|
| 3,543,259 | 11/1970 | Klyce | 340/200 |
| 3,286,252 | 11/1966 | Bose et al. | 340/200 |
| 2,701,357 | 2/1955 | Newby | 340/200 |
| 3,222,668 | 12/1965 | Lippel | 340/347 P |
| 3,421,371 | 1/1969 | Williams, Jr. | 317/253 |
| 3,312,892 | 4/1967 | Parnes | 340/200 |

OTHER PUBLICATIONS

Electronics, August 16, 1971, pp. 86 to 88, "Position Sensor" by E. V. Hardway, Jr.

*Primary Examiner*—John W. Caldwell
*Assistant Examiner*—Robert J. Mooney
*Attorney*—Hyer, Eickenroht, Thompson & Turner

[57] ABSTRACT

A capacitive switching device including a driven element with at least one active, conductive driven sector connected to a source of alternating voltage, a receptor element with at least one active, conductive receptor sector and a conductive shield element with at least one open slot permitting capacitive coupling between said driven sector and said receptor sector when these are in alignment with said slot. The elements are aligned with respect to each other so that relative movement of the shield element with respect to the driven and receptor elements produces output electrical signals responsive to a switching pattern on the driven element, the receptor element or on both. The shield element is preferably grounded.

13 Claims, 8 Drawing Figures

EDWARD V. HARDWAY, JR.
INVENTOR.

BY Hyer, Eickenroht, Thompson, & Turner
ATTORNEYS

EDWARD V. HARDWAY, JR.
INVENTOR.

BY Hyer, Eickenroht, Thompson + Turner
ATTORNEYS

EDWARD V. HARDWAY, JR.
INVENTOR.

BY Hyer, Eickenroht, Thompson & Turner
ATTORNEYS

CAPACITIVE SWITCHING DEVICE

This invention relates to a capacitive switching device and in one of its aspects to such a device which may be used for digital encoding or on-off event programming.

The prior art includes numerous switching devices for providing incremental on-off switching. These devices are used as digital encoders to provide a digital indication of the position of a rotary shaft, or for on-off event programming. Many of these devices rely on mechanical wiping contacts or make and break contacts, and such contacts wear or become unreliable when dirty. Thus, these devices require frequent replacement or maintenance. Other such devices, which have better resolution and are more reliable, are optically controlled. However, the optical switching devices include a plurality of light sources subject to periodic failure, require precise optical alignment, and are generally relatively expensive.

The present invention relates to a novel capacitive switching device for use as an incremental switching or digital encoding device. The primary object of this invention is too provide such a device which has characteristics such that it can replace prior art mechanical or optical switching devices for many uses in incremental signal switching and encoding.

Another object of this invention is to provide such a capacitive switching device which has relatively better reliability and a longer life than prior art devices provided for the same general purpose.

Another object of this invention is to provide such a capacitive switching device which is particularly adaptable to provide a plurality of electrical output signals which may be utilized to provide a digital representation of a relative mechanical displacement.

Another object of this invention is to provide such a device which may be used as a bidirectional shaft encoder to provide a digital representation of the relative position of a rotary shaft.

Another object of this invention is to provide a capacitive switching device which may be readily programmed to provide control of a sequence of operations.

Another object of this invention is to provide a capacitive switching device which is relatively inexpensive and simple to construct and can accomplish the above objects without the use of wiping contacts, make and break contacts or light sources which are subject to frequent maintenance.

These and other objects are accomplished, according to the illustrated preferred embodiments of this invention, by mounting a movable shield element between a driven element connected to a source of input electrical signals and a receptor element connected to an amplifier for providing an electrical output signal responsive to the capacitance between the respective elements. The shield element includes at least one slot and the receptor element or the driven element includes at least one encoded active sector providing a predetermined switching pattern. The shield element is preferably grounded. The capacitive elements are aligned with respect to each other so that as the slot or slots on the shield element are moved with respect to the encoded active sector, electrical output signals are provided in response to the switching pattern of the encoded active sector.

In the drawings, wherein like reference numerals are used throughout to designate like parts, FIG. 1 is a front view of a housing in which the preferred form of capacitive switching device of this invention is mounted;

Figure 2:
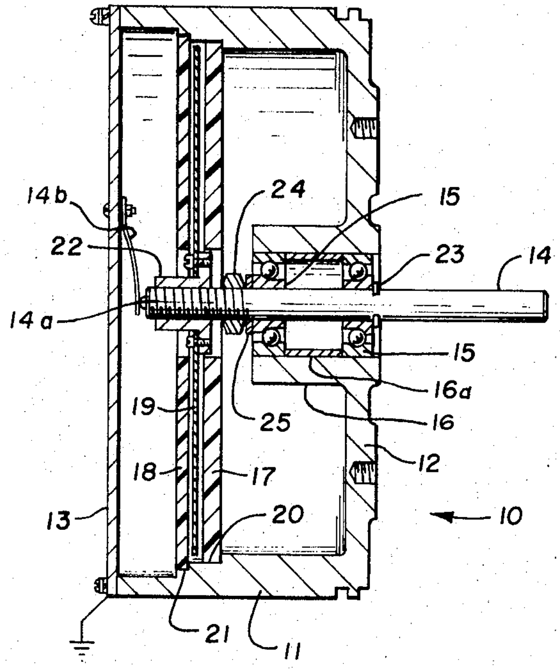
FIG. 2 is a sectional view taken at 2—2 of FIG. 1.

Referring to the drawings, the capacitive switching device 10 of the invention is described by the preferred embodiments illustrated in the context of two stationary elements or plates 17 and 18 and a rotary movable shield element or plate 19 therebetween, mounted in a suitable housing 11. However, the apparatus described can be easily modified in accordance with the teachings of this invention to provide for a linear motion capacitive switching device, including two stationary elements and a movable element mounted for straight line motion therebetween. Also, the capacitor elements may be flat, spaced-apart plates, or they may be cylindrical capacitive elements mounted for rotational or linear movement with respect to each other, without departing from the spirit of this invention.

Figure 1:
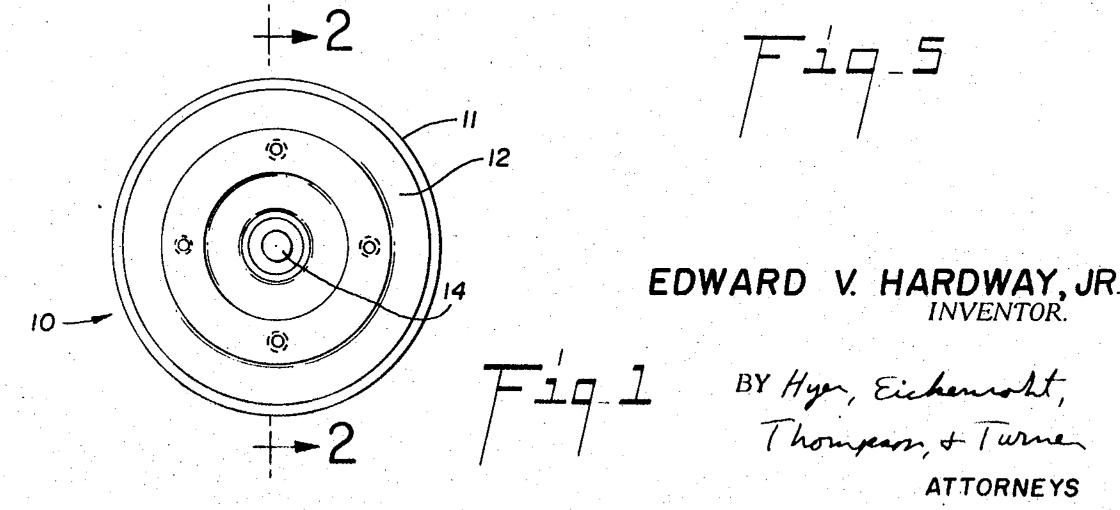

Housing 11 for device 10 illustrated in FIGS. 1 and 2 includes a cylindrical front member 12 and circular back cover 13, and capacitive elements of the device are mounted therebetween. A rotatable shaft 14 extending from housing 11 is adapted to be coupled to a mechanical input element (not shown), to which the device is to respond. Shaft 14 is mounted along its axis of rotation by suitable bearings 15 mounted in a hub 16 extending from housing member 12 into the interior of housing 11, and the bearings are spaced apart in hub 16 by a cylindrical sleeve **16*a*. Electrical connections to the capacitive switching device may be made by wires (not shown) extending from capacitive elements 17 and 18 and through back cover 13. It is preferred that housing 11 be electrically grounded, and shield 19 is grounded through shaft 14 and bearings 15 or, if this does not provide a good ground, by a resilient clip 14*b* connected to cover 13 and pressing against the end of shaft 14, or other suitable means. Since clip 14*b*** shunts an already low impedance, does not make or break, or carry significant currents, it is not subject to frequent maintenance.

Device 10 includes two circular, parallel capacitive elements or plates 17 and 18 fixably mounted in housing 11 and a movable element or plate 19 positioned in housing 11 in parallel relation between the other two plates. Plate 17 is a driven plate and is mounted on a shoulder 20 in housing 11, and plate 18 is a receptor plate and is mounted on shoulder 21 in housing 11, and both plates include openings in their center through which shaft 14 can pass without interference. Movable plate 19 comprises a rotatable shield and is mounted on shaft 14 for rotation therewith by a bushing 22 screwed onto a threaded portion 14*a* of shaft 14, and is closely spaced from plates 17 and 18. Shaft 14 is tightly held against axial movement in bearings 15 by a snap ring 23 bearing against the front of bearings 15, and a nut 24 and washer 25 screwed on threads 14a and bearing against the back side of bearings 15. This general description with reference to FIGS. 1 and 2 may apply to both the embodiments of this invention illustrated in FIGS. 3 and 6.

Figure 5:
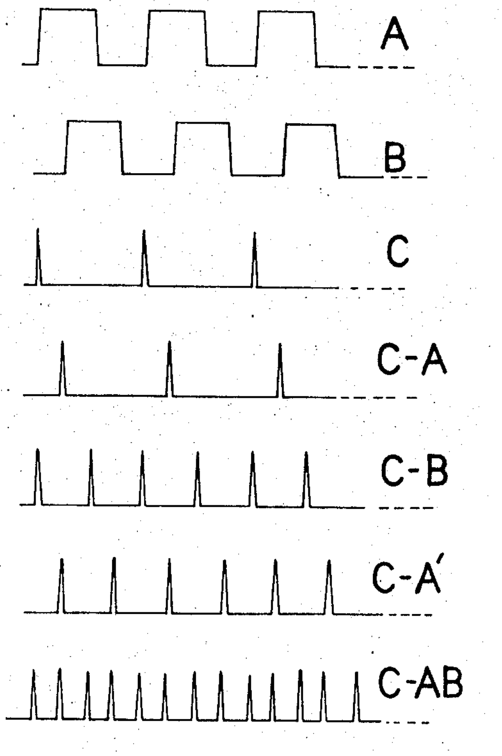
FIG. 5 is a wave form diagram showing various output signals from the device of FIG. 3.
Figure 3:
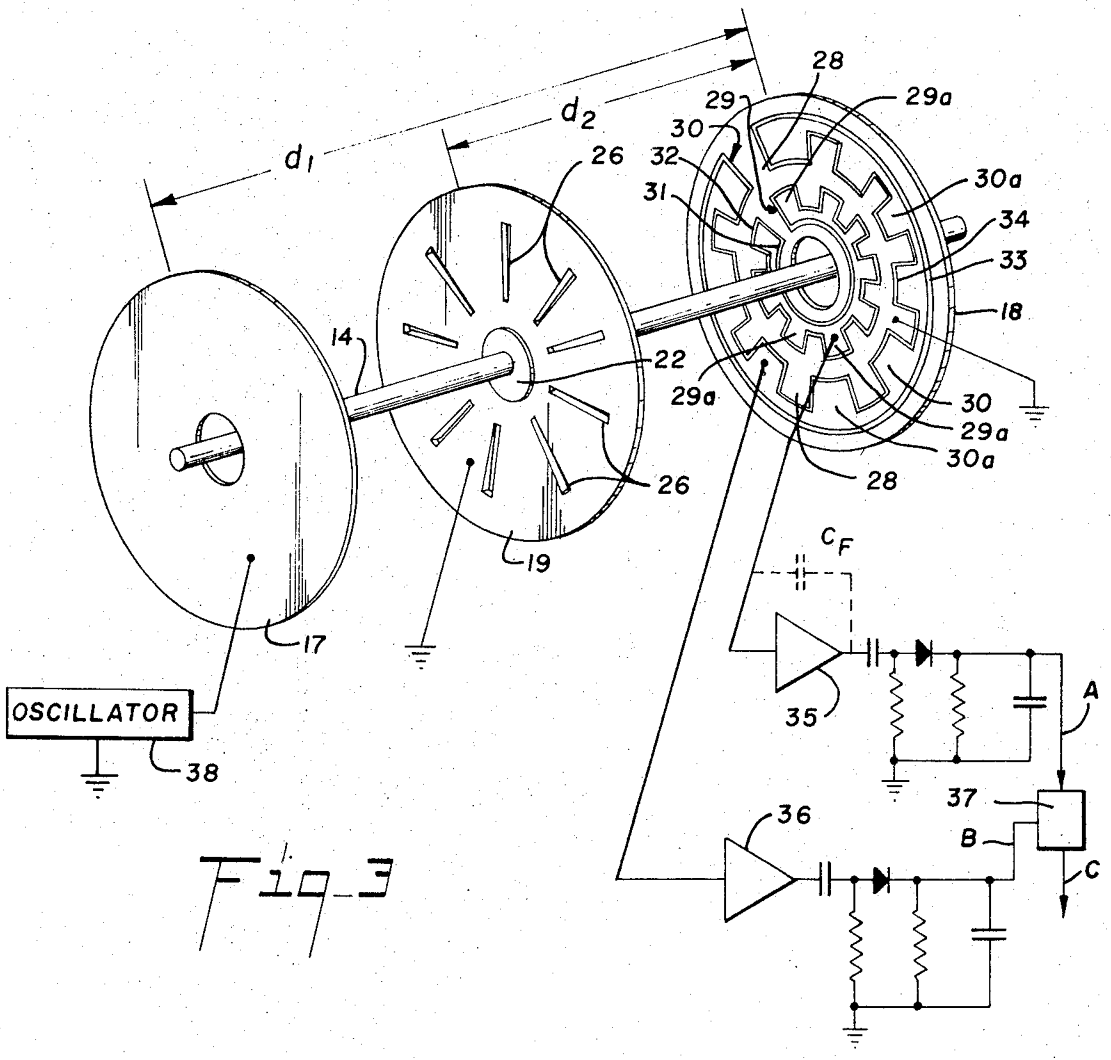
FIG. 3 is a diagramatic view of one embodiment of the preferred form of capacitive switching device of this invention used as an incremental shaft encoder.
Figure 4:
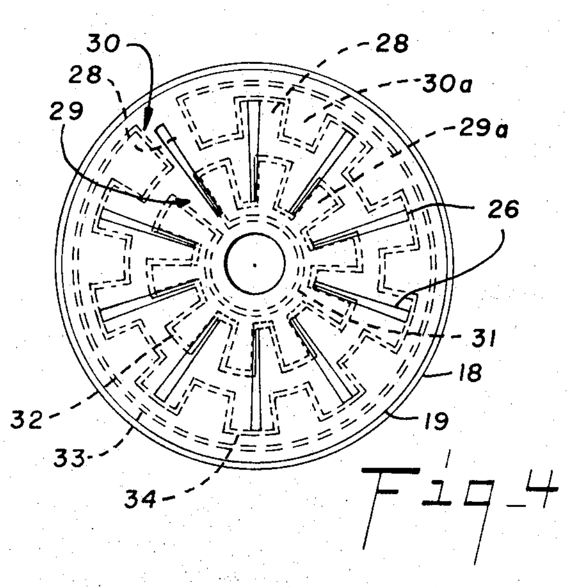
FIG. 4 is a view in elevation of the shield element of the device of FIG. 3 aligned with respect to the receptor element of that device.

Referring now to the embodiment of this invention illustrated in FIGS. 3–5, driven plate 17 may, for example, be formed on a circular disk made of an insulating plastic such as that used in printed circuit boards with a thin copper film covering the side of the disk facing plate 18. Movable shield plate 19 may also be formed on a generally circular disk of insulated plastic, and in the embodiment illustrated in FIG. 3, includes a plurality of narrow slots 26 symmetrically spaced about its circumference and about shaft 14. In this embodiment, 10 slots are provided and, of course, a smaller or larger number of slots can be used, depending on the amount of capacitive coupling between plates 17 and 18 desired. Also, generally, the more slots and the narrower they are the better the resolution. Plate 19 includes a thin copper metal coating covering one side of the plate (except the slots) and electrically connected with shaft 14 through metal bushing 22. Plate 19 rotates with shaft 14 and is assembled in housing 10 so that the side with the metal coating is facing towards receptor plate 18. Of course, both plates 17 and 19 may be made entirely of thin conducting metal, such as copper.

Receptor plate 18 also is preferably formed on a circular insulating plastic disk and comprises a single thin film of copper covering the entire side facing rotary shield plate 19. However, in the embodiment of this invention illustrated in FIGS. 3 and 4, this film of copper is divided into a guard area 28 and two active sectors 29 and 30. The boundaries of sector 29 are formed by and are between narrow separations 31 and 32 connected together at their ends, which separate the conductive film of sector 29 from electrical contact with the conductive film of guard area 28. Separation 31 is circular about the axis of shaft 14 with a relatively short radius from this axis. Separation 32, in the embodiment illustrated, forms sector 29 into ten alternate, equal size lobes 29*a* so that a switching pattern is formed by sector 29 which resembles the alternate, flat peaks and valleys of a square wave form. Sector 30 is of the same configuration, but its boundaries are formed by a narrow, circular separation 33 on a relatively long radius from the axis of shaft 14 and near the outer edge of disk 18, and a narrow separation 34 connected to an end of separation 33, and projecting inwardly from separation 33 and toward the center of plate 18, forming sector 30 into 10 alternate, equal size lobes 30*a* of conductive film forming a second switching pattern on plate 18 similar to a square wave pattern. Separations 33 and 34 separate the conductive film of sector 30 from electrical contact with the conductive film of guard area 28. Sector 30 is offset circumferentially from sector 29 so that the lobes of sector 30 overlap circumferentially with the lobes of sector 29, and preferably the radial edges of the lobes of sector 30 are on radii midway between the radii on which the radial edges of the lobes of sector 29 fall. Thus, sectors 29 and 30 provide encoded switching patterns on plate 18. The arrangement described improves the resolution obtained from a given size of plate 18 because the two distinctive switching patterns divide shaft 14 into twice the number of discreet parts to be counted. Also, this arrangement enables the direction of rotation of shaft 14 to be electronically distinguished.

Guard area 28 of stationary plate 18 is also connected to ground while active sectors 29 and 30 are each connected respectively to the inputs of high gain amplifiers 35 and 36. The outputs A and B respectively of amplifiers 35 and 36 may be connected to an electronic translator circuit 37 which produces an output signal C. Movable plate 19 is also connected to ground through the bushing 22 and shaft 14, which along with housing 11 is grounded. Plate 17 is connected to a source 38 of alternating current electrical energy of sufficiently high frequency in relation to the rotational speed of shaft 14 and with respect to the amount of the capacitive coupling between plates 17 and 18 through slots 26, to provide outputs A and B of sufficient magnitude to be utilized in response to the switching pattern of plate 18. When high rotational speeds are encountered, it is desired that the frequency of source 38 be substantially higher than that needed for minimal resolution. For example, at 3,600 RPM shaft 14 would turn 21,600° per second. For 1° resolution the frequency should be much higher, say 216,000 Hz or 10 cycles per degree.

Plates 17, 18 and 19 are arranged so that movable plate 19 acts as a variable shield between the other two. They are aligned with respect to each other along the axis of shaft 14 so that as plate 19 is rotated with respect to plate 18 in either direction about the shaft 14, each of slots 26 pass substantially simultaneously from a position adjacent guard area 28 and between adjacent lobes 29*a* and 30*a*, then to a position adjacent a lobe portion of one of active sectors 29 or 30, then to a position adjacent lobe portions of both of active sectors 29 and 30, then to a position adjacent a lobe portion of the other of active sectors 29 or 30, and then back to another position adjacent guard area 28. Each of these transitions occurs 10 times during one complete revolution of shaft 14 so that the coupling capacitance between plate 17 and sectors 29 and 30, through slots 26, varies 40 different times during this revolution from substantially zero capacitance, to either the capacitance between only one of the sectors 29 or 30 and plate 17, or the capacitance between both sectors 29 and 30 and plate 17. Thus, as shown in FIG. 5, the output A of amplifier 35 connected to sector 29, and which is responsive to the capacitive coupling between sector 29 and plate 17, varies from substantially zero to a higher level or vice versa each time slots 26 pass to or from adjacent a lobe 29*a* as shaft 14 is rotated. The output B of amplifier 36 connected to sector 30 and which is responsive to the capacitive coupling between sector 30 and plate 17, varies from substantially zero to a higher level or vice versa each time slots 26 pass to or from adjacent a lobe 30*a* as shaft 14 is rotated; however the output B will be out of phase with respect to the output A by an amount proportional to the circumferential offset of sectors 29 and 30. Thus, in the embodiment illustrated, each of outputs A and B come on and go off 10 times per revolution. By this arrangement, and by combining the outputs A and B with electronic translator circuit 37, one revolution of shaft 14 can be represented by count of 10 by counting only the leading edges or the falling edges of one of outputs A or B (outputs C–A or C–B in FIG. 5), by a count of 20 by counting both the leading edges and the falling edges of one of outputs A or B (outputs C–A′ or C–B′ in FIG. 5), or a count of 40 by counting the leading and falling edges of both outputs A and B (output C–AB in FIG. 5). By symmetrically arranging slots 26 about plate 19 and arranging sectors 29 and 30 symmetrically about plate 18, the number of counts obtained from circuit 37 will be an accurate representation of the rotational position of shaft 14, and, of course, the more counts per revolution the better the resolution.

Figures 6, 7:
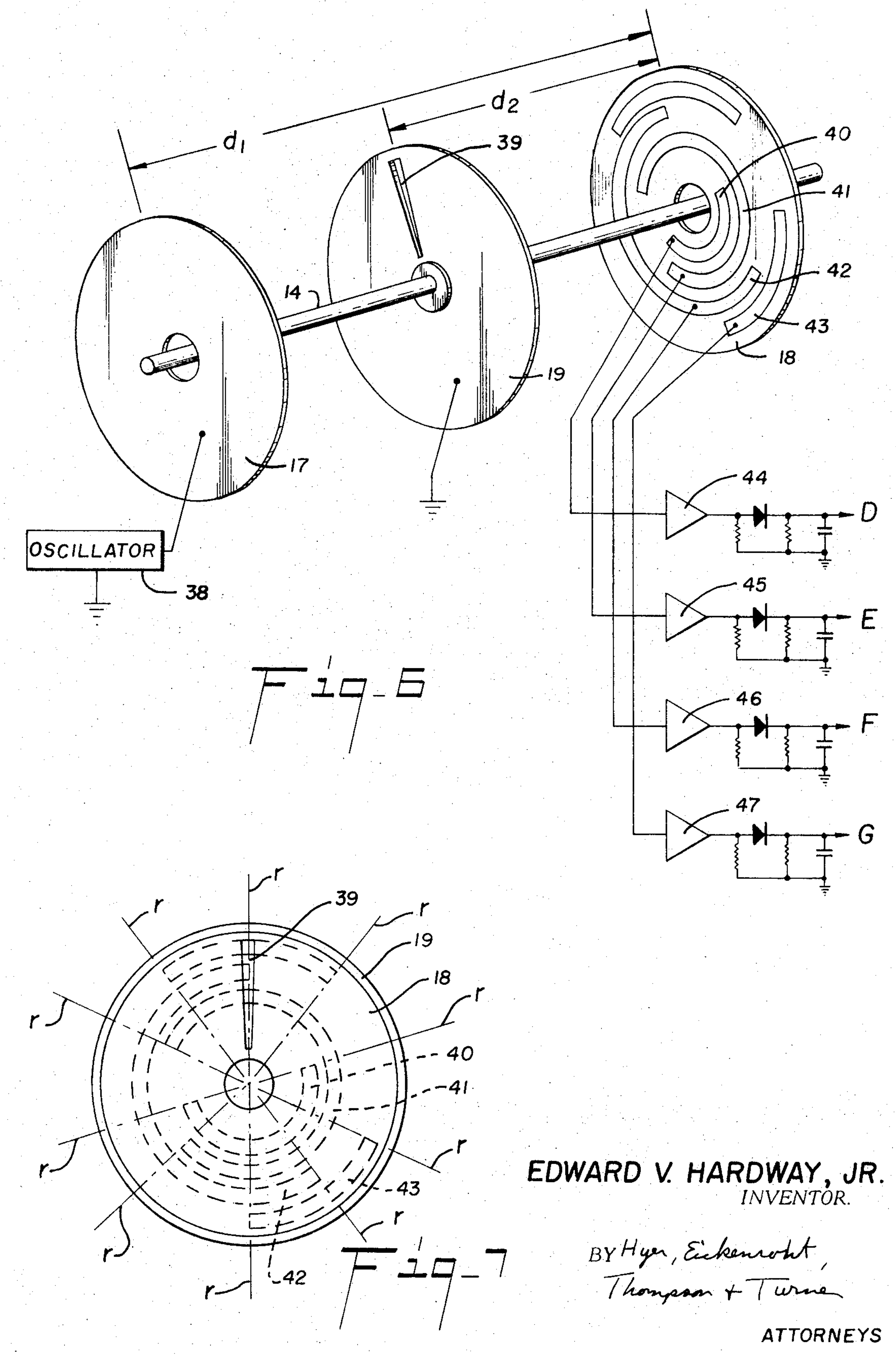
FIG. 6 is a diagramatic view of another embodiment of the preferred form of capacitive switching device of this invention which may be used as a digital encoder or as an on-off event programmer.
FIG. 7 is a view in elevation of the shield element of the device of FIG. 6 aligned with respect to the receptor element of that device.

FIGS. 6 and 7 illustrate another form of the preferred embodiment of this invention which may be used as an absolute encoder or an on-off event programmer. In the application as an event programmer, shaft 14 may be driven by a suitable timing motor (not shown) so that its rotational speed corresponds to one cycle of the operations or events to be controlled. For example, one revolution of shaft 14 may represent one complete cycle of operation (wash, rinse and spin) of a washing machine. The capacitive elements or plates 17, 18 and 19 may be formed in the manner described in conjunction with the elements of the FIG. 3 embodiment; however, shield plate 19 includes only one slot 39, and plate 18 includes a plurality of generally continuous, arcuate active sectors 40, 41, 42 and 43 each being offset radially from each other on plate 18, and together forming a switching pattern on plate 18. Each of these sectors is separated from electrical contact with guard area 28 by a small gap or separation (not shown) similar to separations 31–34. The circumferential extent of each of sectors 40–43 and their relative position about the circumference of plate 18 depends on the on-time of the function it is to control, and the time at which this function is to start or stop in relation to other functions being controlled. Each of active sectors 40–43 are respectively connected to the inputs of high gain amplifiers 44, 45, 46 and 47. The output signals from each of amplifiers 44–47 are rectified to respectively provide D.C. output signals D, E, F and G which can be used to control switching circuits of various mechanisms to be controlled in a timed sequence.

In using the embodiment of FIGS. 6 and 7 as an absolute digital shaft encoder, one revolution of shaft 14 can be divided into a number of discreet parts, for example 10, by the switching pattern shown in FIG. 7. This is accomplished by placing each of the radial edges of each of sectors 40–43 along one of ten equally spaced radii *r* of plate 18 so that each time slot 39 is adjacent such an edge, one of outputs D–G either comes on or goes off. The coded pattern illustrated in FIG. 7 is an excess −3 minimum change code.

Referring again to both embodiments of FIGS. 3 and 6, it is highly desirable that the distance $d_1$ between plates 17 and 18 and the distance $d_2$ between plates 18 and 19 be kept small and that the distance $d_2$ be small compared to the length or the circumference of the active sectors on plate 18. This minimizes any curvature or fringing effect in the field between the plates 18 and 17. In the embodiments illustrated in FIG. 3 and FIG. 6, the values of $d_1$ and $d_2$ may be about 0.1″ and 0.01″ respectively.

Figure 8:
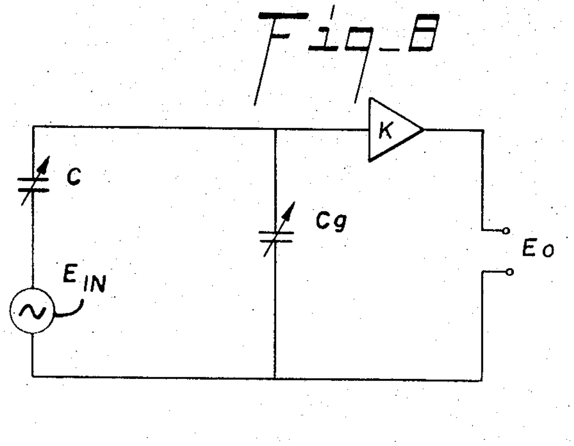
FIG. 8 is a schematic view showing the equivalent circuit of the devices of FIG. 3 and FIG. 6 with the electrical input and output circuits connected to them.

As the plates 18 and 19 are placed close together, the capacitance between plate 19 and the active sectors on plate 18 is quite large compared to the capacitance between the plates 17 and 18. In effect, a capacitive divider is formed as illustrated by the equivalent circuit of FIG. 8 where K represents the high gain amplifier connected to one of the active sectors. A variable capacitor C corresponds to the capacitance between plate 17 and that active sector of plate 18. Also, a capacitive $Cg$ is formed between this active sector of plate 18 and shield plate 19, and other grounded surroundings. Thus, the input signal to high gain amplifier K will be quite low and amplifier K should preferably be close to the device 10 or built in to it for maximum sensitivity and should preferably have a high input impedance and low output impedance. In some applications, it may be desired that the effect of the capacitor $Cg$ be minimized by effectively shunting capacitance $Cg$ by a substantially larger capacitance. This can be accomplished in the embodiments illustrated in FIG. 3 and FIG. 6 by connecting each active sector of plate 18 to an input circuit of one of the high gain amplifiers including a negative feedback capacitor $C_f$ such as shown in dotted lines in FIG. 3, as being connected from the output to the input of amplifier 35.

Although switching patterns of one or more active sectors may be used on either the driven or the receptor element, for simplicity this disclosure is confined to a configuration wherein the driven element has only one conductive sector and wherein the patterns of slots and active sectors are confined to the shield element and the receptor element. With this arrangement, when an active receptor sector is exposed to an active driven element by a slot or slots in the shield, the capacitive coupling raises the A.C. potential of the receptor sector to a finite voltage level which is, in turn amplified by a high gain amplifier "K" and detected to give D.C. level indicating an "ON" condition. Also, the input signals to the capacitive switching device should be of sufficient magnitude so that an useable output is obtained from the high gain amplifiers, but the dielectric breakdown in device 10 should not be exceeded. It is preferred that relatively low voltages in the order of 10–30 volts be used.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for switching electrical signals comprising: a conductive driven element adapted to be connected to a source of input electrical signals; a receptor element positioned adjacent said driven element; at least one conductive active sector on one of said receptor or driven elements providing a switching pattern; a conductive shield positioned between said driven and receptor elements and including at least one slotted opening; means for causing relative movement between said slotted opening and said active sector; means for maintaining said shield at substantially zero signal level relative to said input electrical signals; and circuit means coupled to said receptor element and providing output electrical signals responsive to said switching pattern during said relative movement, and including an amplifier having a feedback capacitor connected from its output to its input for providing an effective capacitance in shunt with the capacitance between said shield element and said active sector.

2. The apparatus of claim 1 wherein said active sector is on the receptor element and said circuit means is connected to said active sector.

3. The apparatus of claim 1 wherein the switching pattern is provided by an active sector including a plurality of conductive lobes dividing the movement between the shield element and said active sector into a plurality of discreet increments, and wherein said circuit means provides a distinctive electrical signal in response to each conductive lobe when adjacent said slot during such movement.

4. The apparatus of claim 3 further including a second switching pattern provided by a second active sector including a plurality of conductive lobes dividing the movement between the shield element and said second sector into a plurality of discreet increments, said second switching pattern laterally offset with respect to the conductive lobes of said first mentioned switching pattern, and further including second circuit means providing a distinctive electrical signal in response to each conductive lobe on said second active sector when adjacent said slot during such movement.

5. The apparatus of claim 4 further including electronic translator circuit means connected to each of said circuit means and providing electrical outputs in response to one or both of said circuit means.

6. The apparatus of claim 1 wherein said shield element is mounted on a rotatable shaft.

7. The apparatus of claim 1 wherein said switching pattern is provided by a plurality of active sectors encoding the receptor plate, and said circuit means includes means connected to each active sector to provide said electrical output signals responsive to each sector.

8. The apparatus of claim 7 wherein said shield element is mounted on a rotatable shaft and each of said active sectors is arcuate and radially offset from each other.

9. The apparatus of claim 7 further including means for providing said electrical signals in a programmed sequence to control a sequence of operations.

10. The apparatus of claim 8 wherein said switching pattern divides a revolution of said rotatable shaft into a plurality of discreet increments.

11. Apparatus for switching electrical signals comprising: a conductive driven element adapted to be connected to a source of input electrical signals; a receptor element positioned adjacent said driven element and having a plurality of conductive active sectors providing a switching pattern; a conductive shield positioned between said driven and receptor element and including at least one slotted opening; means for causing relative movement between said slotted opening and said active sectors, means for maintaining said shield at substantially zero signal level relative to said input electrical signal, and wherein said shield is mounted on a rotatable shaft for rotation therewith, and wherein each of said active sectors are radially and circumferentially offset from each other and divide the rotation of said shield into discrete increments.

12. The apparatus of claim 11 wherein said receptor element includes two active sectors having alternate conductive lobes radially offset from each other, and having their radially extending edges on radii normal to the axis of rotation of said shaft, and further including circuit means connected to each of said active sectors for providing a first electrical signal responsive to a conductive lobe on one of said active sectors when such lobe is adjacent said slotted opening, and a second electrical signal in response to a conductive lobe on the other active sector when such lobe is adjacent said slotted opening, and electronic translator means connected to said circuit means for combining said first and second distinctive electrical signals to provide a third electrical signal responsive thereto.

13. The apparatus of claim 11 wherein said plurality of active sectors on said receptor element are arranged to provide a coded pattern arranged in an excess – 3 minimum change code.

* * * * *